(12) United States Patent
Yuda (10) Patent No.: US 8,983,527 B2
(45) Date of Patent: Mar. 17, 2015

(54) RADIO COMMUNICATION SYSTEM, RADIO BASE STATION, AND METHOD FOR RECONFIGURING COMMUNICATION PARAMETER

(75) Inventor: Tetsuya Yuda, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 330 days.

(21) Appl. No.: 13/641,044

(22) PCT Filed: Apr. 5, 2011

(86) PCT No.: PCT/JP2011/058638
§ 371 (c)(1), (2), (4) Date: Oct. 12, 2012

(87) PCT Pub. No.: WO2011/129231
PCT Pub. Date: Oct. 20, 2011

(65) Prior Publication Data
US 2013/0029592 A1 Jan. 31, 2013

(30) Foreign Application Priority Data
Apr. 12, 2010 (JP) ................................. 2010-091558

(51) Int. Cl.
*H04B 7/00* (2006.01)
*H04W 24/02* (2009.01)

(52) U.S. Cl.
CPC ..................................... *H04W 24/02* (2013.01)
USPC ............................ 455/524; 455/561; 370/252

(58) Field of Classification Search
CPC ............ H04W 36/0083; H04W 24/10; H04W 84/045; H04W 24/02; H04W 24/04; H04W 24/08; H04W 28/16; H04W 36/0061; H04W 36/20; H04W 52/243; H04W 52/367; H04W 72/082; H04W 7/2606; Y02B 60/50
USPC ......... 455/418–420, 423, 424, 507, 522, 524, 455/561, 115.1–115.4, 452.1; 370/252, 370/328, 218, 331
See application file for complete search history.

(56) References Cited

U.S. PATENT DOCUMENTS

| 2009/0122739 A1 | 5/2009 | Yonezawa |
| 2010/0128620 A1 | 5/2010 | Inoue et al. |

(Continued)

FOREIGN PATENT DOCUMENTS

| JP | 2008-118420 A | 5/2008 |
| JP | 2008-178030 A | 7/2008 |

(Continued)

OTHER PUBLICATIONS

International Search Report; PCT/JP2011/058638; Jul. 12, 2011.

(Continued)

*Primary Examiner* — Sujatha Sharma
(74) *Attorney, Agent, or Firm* — Studebaker & Brackett PC (57) ABSTRACT

A disclosed high-power base station (100) is provided with: an inter-base-station communication unit (140) that transmits, to neighboring base stations, measurement instruction information that instructs the neighboring base stations to measure the reception quality of radio signals sent by the local station; a measurement result collection unit (121) that collects, from the neighboring base stations, measurement result information that indicates reception quality measurement results; and a parameter reconfiguration unit (123) that reconfigures communication parameters for the local station on the basis of the measurement result information collected by the measurement result collection unit (121).

12 Claims, 6 Drawing Sheets

(56) References Cited

U.S. PATENT DOCUMENTS

| | | |
|---|---|---|
| 2011/0199965 A1 | 8/2011 | Ariyoshi et al. |
| 2013/0012212 A1* | 1/2013 | Murakami et al. ............ 455/439 |
| 2013/0017832 A1* | 1/2013 | Suzuki .......................... 455/436 |
| 2013/0301520 A1* | 11/2013 | Aminaka ...................... 370/315 |
| 2014/0248886 A1* | 9/2014 | Yamazaki ..................... 455/443 |
| 2014/0301371 A1* | 10/2014 | Maeda et al. ................. 370/331 |

FOREIGN PATENT DOCUMENTS

| | | | |
|---|---|---|---|
| JP | 2008-252273 A | | 10/2008 |
| JP | 2009-177576 A | | 8/2009 |
| WO | 2008/136418 A1 | | 11/2008 |
| WO | 2009/084465 A1 | | 7/2009 |
| WO | WO2011076097 | * | 6/2011 |

OTHER PUBLICATIONS

An Office Action,Notice of Reason for Rejection, issued by the Japanese Patent Office on Nov. 5, 2013, which corresponds to Japanese Patent Application No. 2012-510625 and is related to U.S. Appl. No. 13/641,044; with English statement of relevance.

* cited by examiner

RADIO COMMUNICATION SYSTEM, RADIO BASE STATION, AND METHOD FOR RECONFIGURING COMMUNICATION PARAMETER

TECHNICAL FIELD

The present invention relates to a radio communication system, a radio base station, and a method for reconfiguring a communication parameter which are capable of coping with a change in a radio propagation environment.

BACKGROUND ART

In a radio communication system such as a cellular system, a radio propagation environment around a radio base station changes when buildings are constructed nearby or installation situations of neighboring base stations change after the installation of the radio base station.

Hence, it has been a common practice to collect information on a radio propagation environment on a regular basis by use of a measurement vehicle carrying measurement equipment. Specifically, the measurement vehicle measures reception quality in locations within a communication area.

Such a collection method has a problem of requiring a large number of man-hours and high costs. In view of this problem, there is proposed an approach of automating the collection work by use of a user radio terminal (see Patent Document 1). In a collection system disclosed in Patent Document 1, a radio terminal measures reception quality and location information, and a server in a network collects the reception quality and the location information from the radio terminal to analyze the information.

PRIOR ART DOCUMENT

Patent Document

Patent Document 1: Japanese Patent Application Publication No. 2009-177576

SUMMARY OF THE INVENTION

However, in the collection system disclosed in Patent Document 1, the load for collecting and analyzing reception quality and location information concentrates in the server. Accordingly, a server with high processing performance needs to be installed in the network, which causes a problem of high costs.

Moreover, when a change in the radio propagation environment is detected as a result of the analysis, an operator generally reconfigures a communication parameter (configuration) of the radio base station. There is another problem that this reconfiguration work requires much labor.

Hence, an objective of the present invention is to provide a radio communication system, a radio base station, and a method for reconfiguring a communication parameter which are capable of easily coping with a change in a radio propagation environment.

The present invention has the following features in order to solve the aforementioned problem. First of all, a feature of the radio communication system is summarized as follows. A radio communication system includes a plurality of radio base stations, wherein a target base station (e.g. high power base station 100) being a target for reconfiguring a communication parameter comprises: a measurement instruction transmitter (inter-base station communication unit 140) configured to transmit measurement instruction information to a neighboring base station (e.g. low power base station 200*a*, low power base station 200*b*, high power base station 100') located near the target base station, the measurement instruction information giving an instruction to measure reception quality of a radio signal transmitted by the target base station; a measurement result collector (measurement result collector 121) configured to collect, from the neighboring base station, measurement result information indicating a result of measurement of the reception quality; and a parameter reconfiguration unit (parameter reconfiguration unit 123) configured to reconfigure the communication parameter of the target base station according to the measurement result information collected by the measurement result collector.

Another feature of the radio communication system is summarized as follows. In the radio communication system according to the aforementioned feature, the neighboring base station comprises: a measurement instruction transfer unit (transfer controller 221) configured to transfer the measurement instruction information received from the target base station, to a controlled terminal being a radio terminal connecting to the neighboring base station; and a measurement result transfer unit (transfer controller 221) configured to collect the measurement result information from the controlled terminal and transfer the collected measurement result information to the target base station.

Another feature of the radio communication system is summarized as follows. In the radio communication system according to the aforementioned feature, the neighboring base station comprises: a reception quality measurement unit (reception quality measurement unit 211) configured to measure the reception quality in response to the measurement instruction information received from the target base station; and a measurement result transmitter (inter-base station communication unit 240) configured to transmit, to the target base station, the measurement result information indicating a result of measurement by the reception quality measurement unit.

Another feature of the radio communication system is summarized as follows. In the radio communication system according to the aforementioned feature, a low power base station (low power base station 200*a*, low power base station 200*b*) having a smaller transmission power than the target base station is included as the neighboring base station.

Another feature of the radio communication system is summarized as follows. In the radio communication system according to the aforementioned feature, the measurement instruction transmitter transmits the measurement instruction information on a regular basis.

Another feature of the radio communication system is summarized as follows. In the radio communication system according to the aforementioned feature, the measurement instruction information comprises: an identifier for identifying the target base station; and measurement condition information indicating a condition for measuring the reception quality.

Another feature of the radio communication system is summarized as follows. In the radio communication system according to the aforementioned feature, the target base station comprises an analysis unit (analysis unit 122) configured to determine whether or not the communication parameter of the target base station needs to be reconfigured, by analyzing the measurement result information collected by the measurement result collector.

Another feature of the radio communication system is summarized as follows. In the radio communication system according to the aforementioned feature, in a case where a radio relay station is connected to the target base station, the measurement instruction transmitter transmits the measurement instruction information to the neighboring base station and the radio relay station.

A feature of a radio base station is summarized as follows. The radio base station comprises: a measurement instruction transmitter configured to transmit measurement instruction information to a neighboring base station located near the radio base station, the measurement instruction information giving an instruction to measure reception quality of a radio signal transmitted by the radio base station; a measurement result collector configured to collect measurement result information indicating a result of measurement of the reception quality from the neighboring base station; and a parameter reconfiguration unit configured to reconfigure a communication parameter of the radio base station according to the measurement result information collected by the measurement result collector.

Another feature of a radio base station is summarized as follows. The radio base station comprises: a measurement instruction receiver configured to receive measurement instruction information from a target base station being a target for reconfiguring a communication parameter, the measurement instruction information giving an instruction to measure reception quality of a radio signal transmitted by the target base station; a measurement instruction transfer unit configured to transfer the measurement instruction information received by the measurement instruction receiver, to a controlled terminal being a radio terminal connecting to the radio base station; and a measurement result transfer unit configured to collect the measurement result information from the controlled terminal and transfer the collected measurement result information to the target base station.

Another feature of a radio base station is summarized as follows. The radio base station comprises: a measurement instruction receiver configured to receive measurement instruction information from a target base station being a target for reconfiguring a communication parameter, the measurement instruction information giving an instruction to measure reception quality of a radio signal transmitted by the target base station; a reception quality measurement unit configured to measure the reception quality in response to the measurement instruction information received from the target base station; and a measurement result transmitter configured to transmit the measurement result information indicating a result of measurement by the reception quality measurement unit to the target base station.

A feature of a method for reconfiguring a communication parameter is summarized as follows. The method is used in a radio communication system including a plurality of radio base stations, and comprises the steps of: transmitting, by a target base station being a target for reconfiguring the communication parameter, measurement instruction information giving an instruction to measure reception quality of a radio signal transmitted by the target base station, to a neighboring base station located near the target base station; collecting by the target base station measurement result information indicating a result of measurement of the reception quality; and reconfiguring by the target base station the communication parameter of the target base station according to the measurement result information collected in the collecting step.

The present invention can provide a radio communication system, a radio base station, and a method for reconfiguring a communication parameter which are capable of easily coping with a change in a radio propagation environment.

DESCRIPTION OF THE EMBODIMENTS

First to third and other embodiments of the present invention will be described with reference to the drawings. In the following drawings of the respective embodiments, the same or similar portions are assigned the same or similar reference numerals.

First Embodiment (1) Configuration of Radio Communication System

Firstly, a configuration of a radio communication system of a first embodiment will be described in the following order. (1.1) Overall schematic configuration, (1.2) configuration of high power base station, (1.3) configuration of low power base station, and (1.4) configuration of radio terminal.

(1.1) Overall Schematic Configuration

Figure 1:
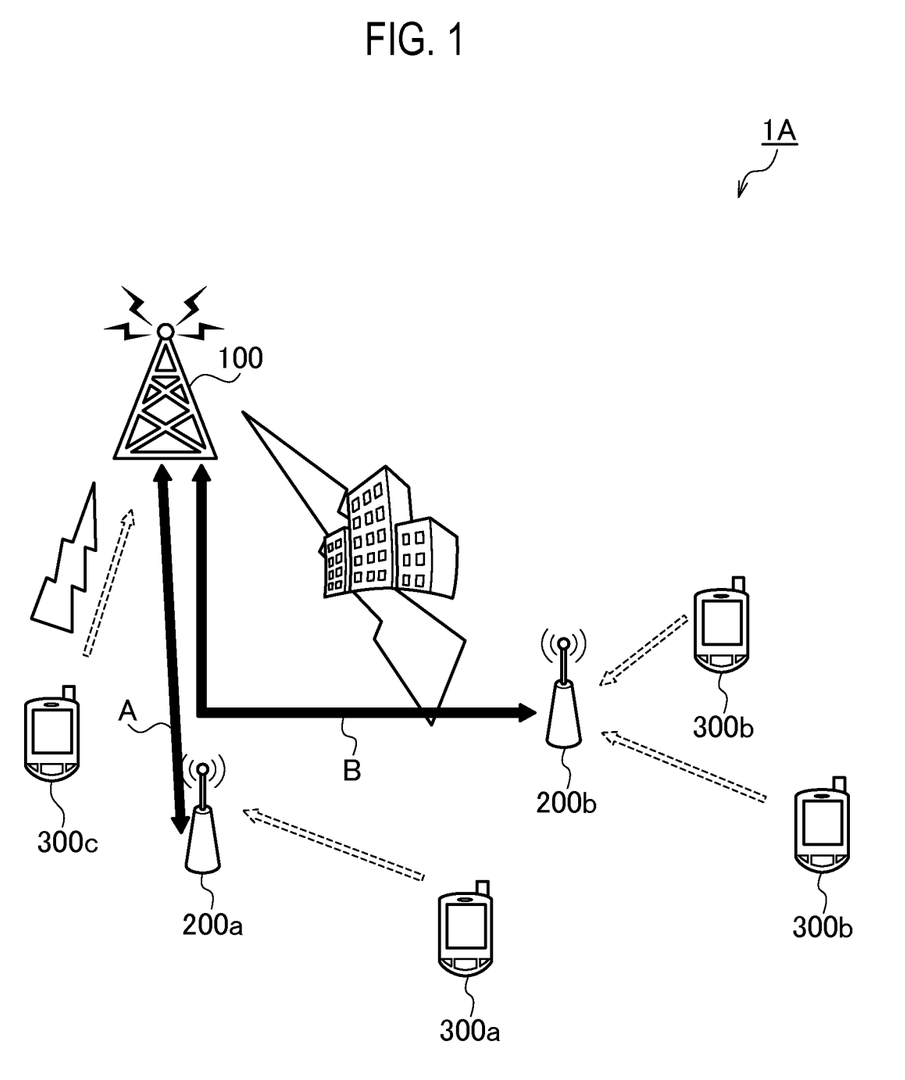
FIG. 1 is a schematic configuration diagram of a radio communication system of a first embodiment of the present invention.

FIG. 1 is a schematic configuration diagram of a radio communication system 1A of the first embodiment. The radio communication system 1A has a configuration according to LTE (Long Term Evolution) Release 9 which is a 3.9 generation (3.9G) cellular system, or a configuration according to LTE-Advanced which is positioned as a fourth generation (4G) cellular system.

As shown in FIG. 1, the radio communication system 1A includes a high power base station 100, low power base stations 200 (200a, 200b), and radio terminals 300 (300a, 300b, 300c). The low power base station 200a connects to the high power base station 100 via an X2 interface A. The low power base station 200b connects to the high power base station 100 via an X2 interface B. The radio terminal 300a connects to the low power base station 200a through a radio communication section. The two radio terminals 300b connect to the low power base station 200b through radio communication sections. The radio terminal 300c connects to the highpower base station 100 through a radio communication section.

In the first embodiment, each of the radio terminal 300a, the radio terminal 300b, and the radio terminal 300c has a function of measuring reception quality and a function (such as GPS) of measuring its own location. Here, reception quality refers to a reception power level, a reception SNR (Signal to Noise ratio) or the like. Each of the radio terminal 300*a*, the radio terminal 300*b*, and the radio terminal 300*c* may be in a waiting state (idle state) or in a communicating state (active state).

Each of the low power base station 200*a* and the low power base station 200*b* is a picocell base station (or a femtocell base station) having a smaller transmission power than the high power base station 100. Each of the low power base station 200*a* and the low power base station 200*b* is installed near the high power base station 100 (specifically, within a communication area of the high power base station 100) mainly for distribution of the traffic load of the high power base station 100. Due to having a small transmission power, each of the low power base station 200*a* and the low power base station 200*b* is installed in a low place. In the first embodiment, each of the low power base station 200*a* and the low power base station 200*b* has a function of measuring reception quality.

In the first embodiment, each of the X2 interface A and the X2 interface B is set to a backhaul network (not shown) which is a wired communication network. A backhaul network is provided by a telecommunication carrier and is formed of a router and the like which is omitted in the drawing. The high power base station 100 and the low power base station 200*a* can directly communicate with each other via the X2 interface A. In addition, the high power base station 100 and the low power base station 200*b* can directly communicate with each other via the X2 interface B.

The high power base station 100 is a macrocell base station forming a wide communication area or a microcell base station. The high power base station 100 is installed in a high place to cover its wide communication area. However, if a building is newly constructed near the high power base station 100 as in FIG. 1, the radio propagation environment changes, and a dead zone or a weak field zone may be formed near the high power base station 100.

In the first embodiment, a description is given of a case where a communication parameter of the high power base station 100 is reconfigured when the radio propagation environment around the high power base station 100 changes. A communication parameter refers to a transmission power, an antenna tilt angle, a communication frequency and the like, for example. In the first embodiment, the high power base station 100 is a target base station targeted for reconfiguring of the communication parameter. Each of the low power base station 200*a* and the low power base station 200*b* is a neighboring base station located near the target base station.

(1.2) Configuration of High Power Base Station

Figure 2:
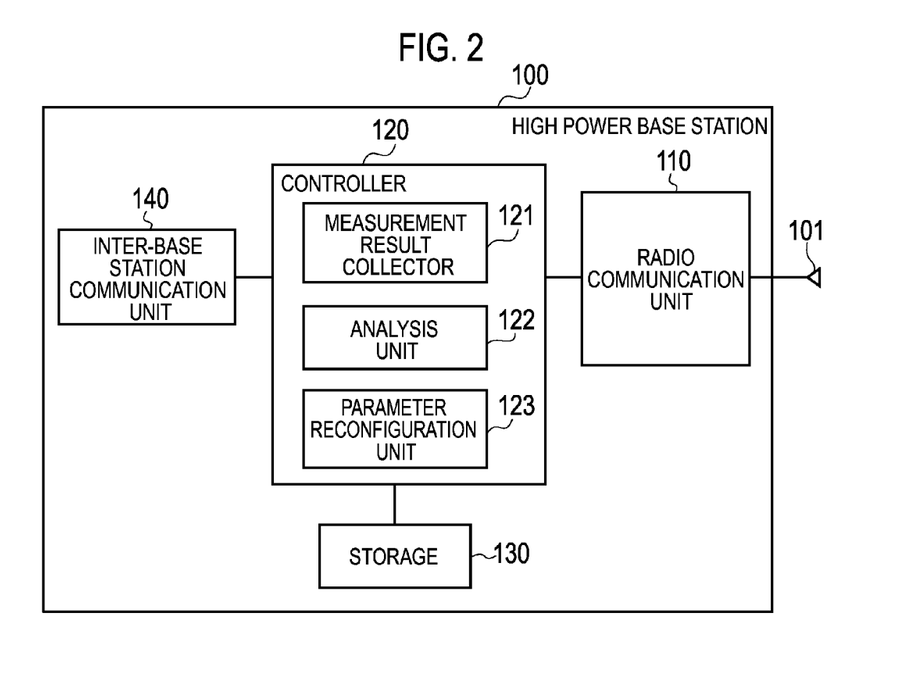
FIG. 2 is a block configuration diagram of a high power base station of the first embodiment of the present invention.

FIG. 2 is a block configuration diagram of the high power base station 100. As shown in FIG. 2, the high power base station 100 includes an antenna unit 101, a radio communication unit 110, a controller 120, a storage 130, and an inter-base station communication unit 140.

The radio communication unit 110 is formed of a radio frequency (RF) circuit, a baseband processor and the like, for example, and exchanges radio signals with the radio terminal 300*c* via the antenna unit 101. In addition, the radio communication unit 110 encodes and modulates transmission signals, as well as demodulates and decodes reception signals.

The controller 120 is formed of a CPU, for example, and controls various functions of the high power base station 100. The storage 130 is formed of a memory, for example, and stores therein various information used for control and the like of the high power base station 100.

The inter-base station communication unit 140 communicates with the low power base station 200*a* via the X2 interface A. Additionally, the inter-base station communication unit 140 communicates with the low power base station 200*b* via the X2 interface B.

The controller 120 includes a measurement result collector 121, an analysis unit 122, and a parameter reconfiguration unit 123.

The measurement result collector 121 collects information on reception quality of radio signals transmitted by the radio communication unit 110. To be specific, the measurement result collector 121 performs control so that the inter-base station communication unit 140 can regularly transmit measurement instruction information to the low power base station 200*a* and the low power base station 200*b* located nearby, the measurement instruction information instructing measurement of reception quality of the radio signal transmitted by the radio communication unit 110. In addition, the measurement result collector 121 performs control so that the radio communication unit 110 can regularly transmit the measurement instruction information to the radio terminal 300*c* connecting to its own high power base station 100.

The measurement result collector 121 collects measurement result information from the radio terminal 300*c*, the low power base station 200*a*, and the low power base station 200*b*, and stores the information in the storage 130.

Figure 3:
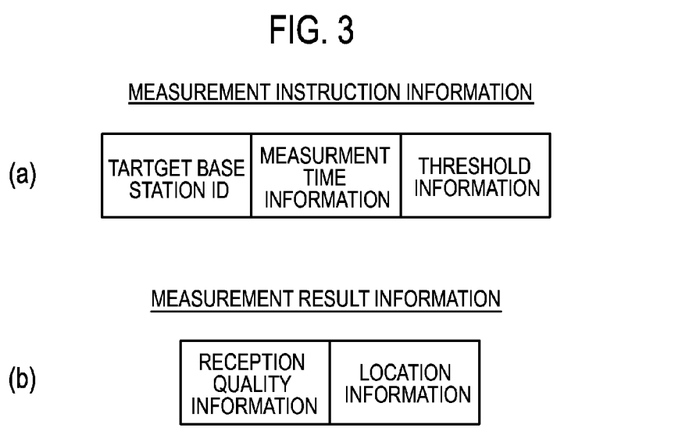
FIG. 3(a) is a diagram showing an example of information elements of measurement instruction information.
FIG. 3(b) is a diagram showing an example of information elements of measurement result information.

FIG. 3(*a*) is a diagram showing an example of information elements of the measurement instruction information. As shown in FIG. 3(*a*), measurement instruction information includes: a base station ID for identifying the high power base station 100; measurement time information for specifying temporal measurement conditions such as the number of times of measurement and measurement intervals; and threshold information which is a threshold of reception quality to determine whether or not to report measurement result information. In the first embodiment, the measurement time information and the threshold information correspond to measurement condition information indicating conditions for measuring reception quality.

FIG. 3(*b*) is a diagram showing an example of information elements of the measurement result information. A shown in FIG. 3(*b*), measurement result information includes reception quality information indicating measured reception quality, and location information indicating a location where a measurement took place.

When a predetermined amount of measurement result information is accumulated in the storage 130, the analysis unit 122 analyzes the measurement result information and determines whether or not the communication parameter of its own high power base station 100 needs to be reconfigured. Moreover, the analysis unit 122 has a function of analyzing whether or not a failure (such as a problem in a power amplifier) has occurred in the radio communication unit 110. If it is determined as a result of the analysis that there is no failure in the radio communication unit 110 while reception quality changes in a specific location, the analysis unit 122 detects a change in the radio propagation environment, and determines that the communication parameter of its own high power base station 100 needs to be reconfigured.

When it is determined that the communication parameter of the own high power base station 100 needs to be reconfigured, the parameter reconfiguration unit 123 reconfigures the communication parameter of the own high power base station 100 according to the accumulated measurement result information. For example, when reception quality in a specific location (such as an edge of a communication area) within its own communication area is deteriorated, the parameter reconfiguration unit 123 reconfigures a tilt angle of the antenna unit 101 so that its transmission directivity toward the specific location may be enhanced. Alternatively, the parameter reconfiguration unit 123 reconfigures the transmission power of the radio communication unit 110 for transmission to the specific location, so that the transmission power is set to a higher value. Moreover, when reception quality for a specific direction is deteriorated due to construction of a building in the communication area of the high power base station 100, for example, the parameter reconfiguration unit 123 reconfigures the transmission directivity or the transmission power of the radio communication unit 110, in a way as to improve the reception quality for the specific direction. If the antenna unit 101 is divided into multiple sectors, the transmission power of a sector corresponding to the direction for which the reception quality is deteriorated may be enlarged. If the antenna unit 101 supports beam forming using multiple antennas, a beam may be directed toward the direction for which the reception quality is deteriorated.

(1.3) Configuration of Low Power Base Station

Figure 4:
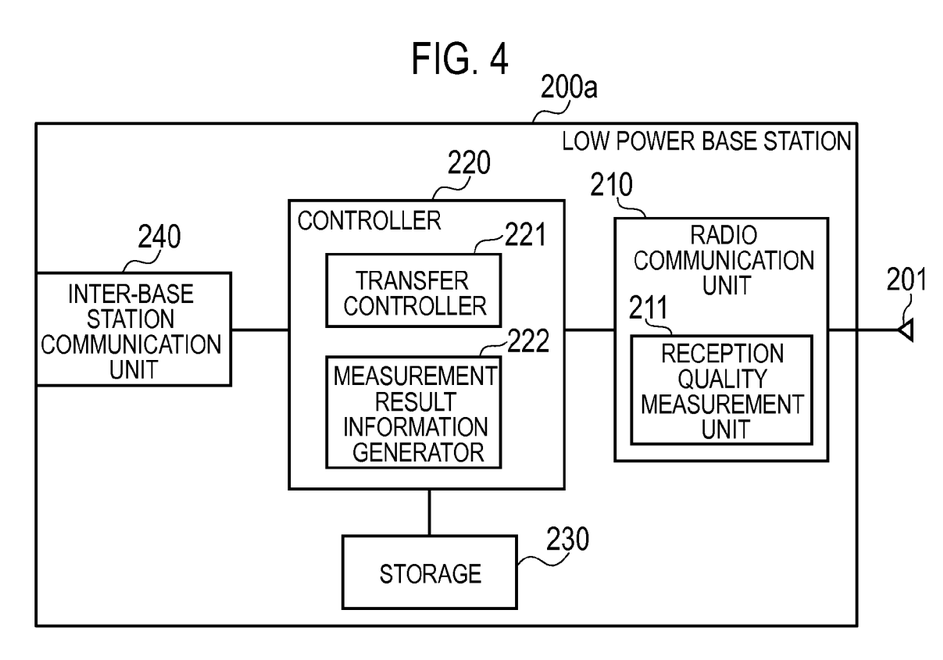
FIG. 4 is a block configuration diagram of a low power base station of the first embodiment of the present invention.

FIG. 4 is a block configuration diagram of the low power base station 200a. Note that the low power base station 200b has the same configuration as the low power base station 200a, and thus the description of the low power base station 200b is omitted.

As shown in FIG. 4, the low power base station 200a includes an antenna unit 201, a radio communication unit 210, a controller 220, a storage 230, and an inter-base station communication unit 240.

The radio communication unit 210 is formed of an RF circuit, a baseband processor and the like, for example, and exchanges radio signals with the radio terminal 300a via the antenna unit 201. In addition, the radio communication unit 210 encodes and modulates transmission signals, as well as demodulates and decodes reception signals.

The controller 220 is formed of a CPU, for example, and controls various functions of the low power base station 200a. The storage 230 is formed of a memory, for example, and stores therein various information used for control and the like of the low power base station 200a. The inter-base station communication unit 240 communicates with the high power base station 100 via the X2 interface A.

The controller 220 includes a transfer controller 221 and a measurement result information generator 222. The radio communication unit 210 includes the reception quality measurement unit 211.

The transfer controller 221 performs control for transferring information exchanged between the inter-base station communication unit 240 and the radio communication unit 210. Specifically, the transfer controller 221 performs control to transfer the measurement instruction information received by the inter-base station communication unit 240 to the radio communication unit 210, and to transfer the measurement result information received by the radio communication unit 210 to the inter-base station communication unit 240.

The reception quality measurement unit 211 measures reception quality of a received radio signal, in response to the measurement instruction information received by the inter-base station communication unit 240. Specifically, since a radio signal transmitted from a radio base station includes a base station ID for identifying the transmission source, the reception quality measurement unit 211 measures reception quality of a radio signal including a base station ID which corresponds to the base station ID included in the measurement instruction information. Additionally, the reception quality measurement unit 211 measures reception quality for the number of times or at intervals indicated by the measurement time information included in the measurement instruction information.

The measurement result information generator 222 generates measurement result information from reception quality information indicating reception quality measured by the reception quality measurement unit 211, and information on the location of its own low power base station 200a previously stored in the controller 220. In a case where the reception quality measured by the reception quality measurement unit 211 exceeds a threshold indicated by threshold information included in the measurement instruction information, the measurement result information generator 222 may omit generation of the measurement result information. The inter-base station communication unit 240 transmits the measurement result information generated by the measurement result information generator 222 to the high power base station 100.

(1.4) Configuration of Radio Terminal

Figure 5:
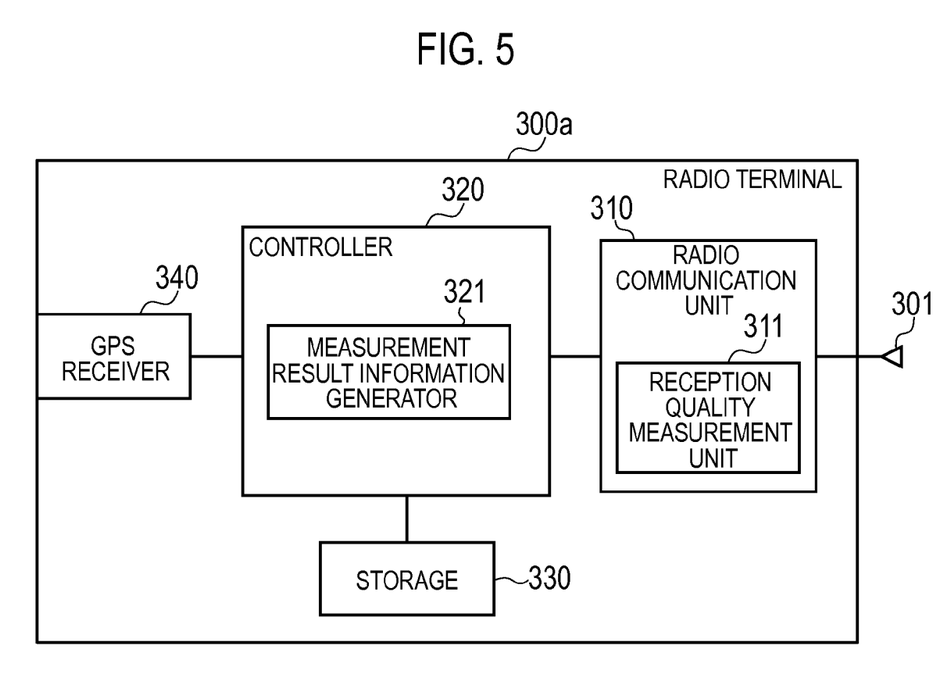
FIG. 5 is a block configuration diagram of a radio terminal of the first embodiment of the present invention.

FIG. 5 is a block configuration diagram of the radio terminal 300a. Note that the radio terminal 300b and the radio terminal 300c have the same configurations as the radio terminal 300a, and thus descriptions of the radio terminal 300b and the radio terminal 300c are omitted.

As shown in FIG. 5, the radio terminal 300a includes an antenna unit 301, a radio communication unit 310, a controller 320, a storage 330, and a GPS receiver 340.

The radio communication unit 310 is formed of an RF circuit, a baseband processor and the like, for example, and exchanges radio signals with the low power base station 200a via the antenna unit 301. In addition, the radio communication unit 310 encodes and modulates transmission signals, as well as demodulates and decodes reception signals. The controller 320 is formed of a CPU, for example, and controls various functions of the radio terminal 300a. The storage 330 is formed of a memory, for example, and stores therein various information used for control and the like of the radio terminal 300a. The GPS receiver 340 measures the location of its own radio terminal 300a, according to signals received from a GPS satellite.

The controller 320 includes a measurement result information generator 321. The radio communication unit 310 includes a reception quality measurement unit 311.

The reception quality measurement unit 311 measures reception quality of a radio signal received from the radio base station identified by the base station ID included in the measurement instruction information. Specifically, since a radio signal transmitted by a radio base station includes a base station ID for identifying the transmission source, the reception quality measurement unit 311 measures reception quality of a radio signal including a base station ID which corresponds to the base station ID included in the measurement instruction information.

The measurement result information generator 321 generates measurement result information from reception quality information indicating reception quality measured by the reception quality measurement unit 311, and location information indicating a location measured by the GPS receiver 340. The radio communication unit 310 transmits the measurement result information generated by the measurement result information generator 321 to the high power base station 100.

(2) Operation of Radio Communication System

Figure 6:
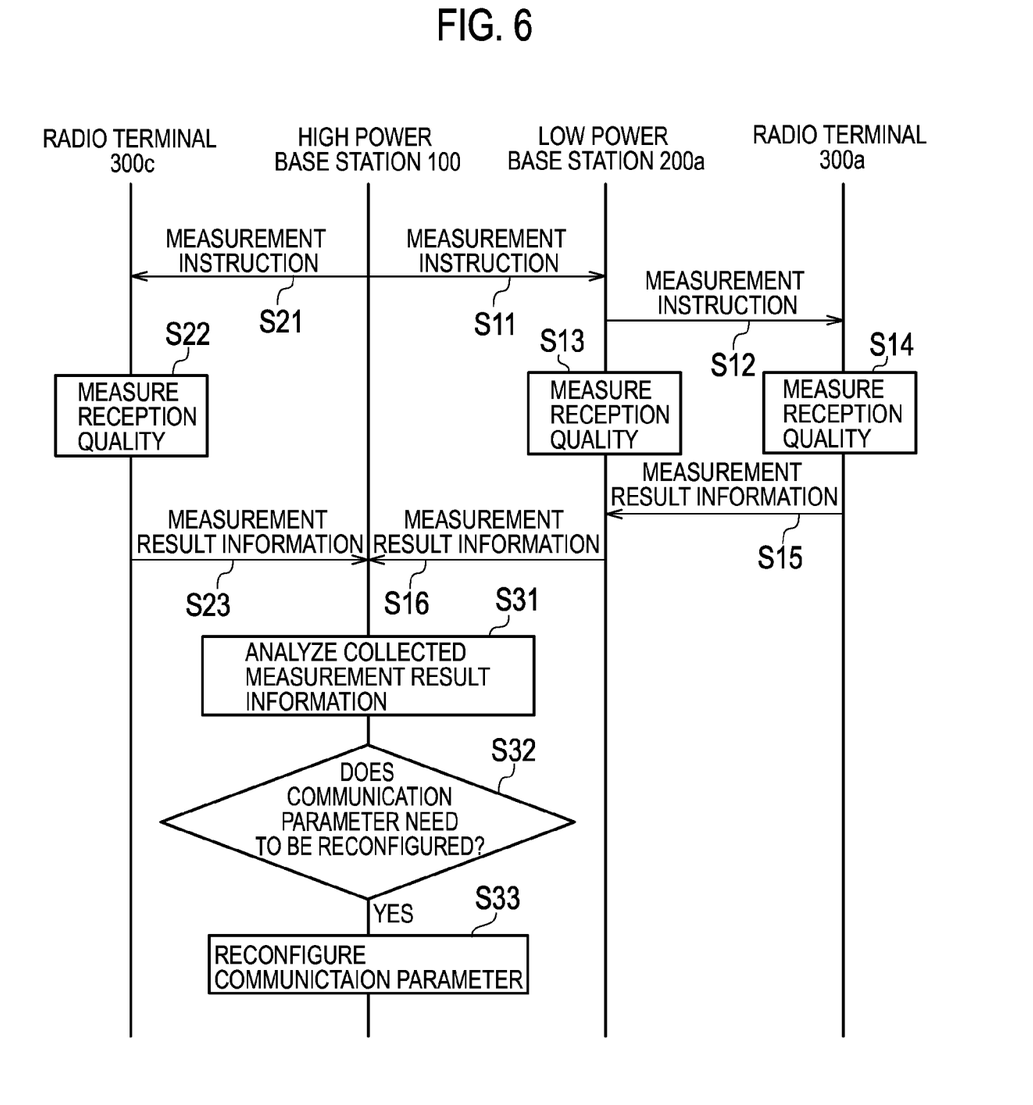
FIG. 6 is an operation sequence chart of the radio communication system of the first embodiment of the present invention.

Next, a description is given of an operation sequence of the radio communication system 1A. FIG. 6 is an operation sequence chart of the radio communication system 1A.

Firstly, a description is given of an operation of collecting measurement result information by use of the low power base station 200a, and the radio terminal 300a connecting to the low power base station 200a.

In step S11, the inter-base station communication unit 140 of the high power base station 100 transmits measurement instruction information to the low power base station 200a. The inter-base station communication unit 240 of the low power base station 200a receives the measurement instruction information via the X2 interface.

In step S12, the transfer controller 221 of the low power base station 200a makes the radio communication unit 210 transmit the measurement instruction information received by the inter-base station communication unit 240 to the radio terminal 300a. The radio communication unit 310 of the radio terminal 300a receives the measurement instruction information through a radio communication section. In step S13, in response to the measurement instruction information received by the inter-base station communication unit 240, the reception quality measurement unit 211 of the low power base station 200a measures reception quality of a radio signal transmitted by the high power base station 100. Note that the processing of step S13 may be performed before step S12 or may be performed concurrently with step S12.

In step S14, in response to the received measurement instruction information, the reception quality measurement unit 311 of the radio terminal 300a measures reception quality of a radio signal transmitted by the high power base station 100. In addition, the GPS receiver 340 of the radio terminal 300a measures its own location.

In step S15, the measurement result information generator 321 of the radio terminal 300a generates measurement result information including reception quality information and location information. The radio communication unit 310 of the radio terminal 300a transmits the generated measurement result information to the low power base station 200a. The radio communication unit 210 of the low power base station 200a receives the measurement result information through a radio communication section.

In step S16, the transfer controller 221 of the low power base station 200a makes the inter-base station communication unit 240 transmit the measurement result information received by the radio communication unit 210, and the measurement result information acquired by measuring by the reception quality measurement unit 211, to the high power base station 100. The inter-base station communication unit 140 of the high power base station 100 receives the measurement result information via the X2 interface. Then, the measurement result collector 121 of the high power base station 100 stores the measurement result information received by the inter-base station communication unit 140 to the storage 130.

Secondly, a description is given of an operation of collecting measurement result information by use of the radio terminal 300c connecting to the high power base station 100.

In step S21, the radio communication unit 110 of the high power base station 100 transmits measurement instruction information to the radio terminal 300c. The radio terminal 300c receives the measurement instruction information through a radio communication section.

In step S22, in response to the received measurement instruction information, the radio terminal 300c measures reception quality of a radio signal transmitted by the high power base station 100. In addition, the radio terminal 300c measures its own location.

In step S23, the radio terminal 300c transmits measurement result information including reception quality information and location information to the high power base station 100. The radio communication unit 110 of the high power base station 100 receives the measurement result information through a radio communication section. Then, the measurement result collector 121 of the high power base station 100 stores the measurement result information received by the radio communication unit 110 to the storage 130.

Thirdly, a description is given of an operation of reconfiguring a communication parameter of the high power base station 100 by using the collected measurement result information.

In step S31, the analysis unit 122 of the high power base station 100 analyses the measurement result information accumulated in the storage 130. The analysis unit 122 determines whether or not a change occurs in reception quality in a specific location by comparing the reception quality among locations. The analysis unit 122 also determines whether or not a failure occurs in the radio communication unit 110 of its own high power base station 100. If there is no failure in the radio communication unit 110 of the own high power base station 100 and a change occurs in reception quality in a specific location, the analysis unit 122 detects a change in the radio propagation environment, and determines that a communication parameter of the own high power base station 100 needs to be reconfigured.

In the case where it is determined that the communication parameter of the own high power base station 100 needs to be reconfigured (step S32: YES), in step S33, the parameter reconfiguration unit 123 of the high power base station 100 reconfigures the communication parameter of the own high power base station 100.

(3) Effects of First Embodiment

As has been described, the high power base station 100 of the first embodiment transmits measurement instruction information to the low power base station 200a and the low power base station 200b, collects measurement result information from the low power base station 200a and the low power base station 200b, and reconfigures its communication parameter according to the collected measurement result information. Since the high power base station 100 performs processing to cope with a change in its surrounding radio propagation environment, the processing load for coping with changes in radio propagation environments can be distributed to radio base stations.

In the first embodiment, reception quality of the high power base station 100 can be measured by use of the radio terminals connecting to the low power base station 200a and the low power base station 200b. Hence, a larger amount of measurement result information can be acquired, and reception quality can be measured for a larger area.

In the first embodiment, the low power base station 200a and the low power base station 200b measure reception quality of the high power base station 100. Accordingly, a larger amount of measurement result information can be acquired, and reception quality can be measured for a larger area. Unlike a traveling radio terminal, the low power base station 200a and the low power base station 200b have fixed locations, and thus can continuously measure reception quality in the same locations.

In particular, the low power base station is installed in a low place because of its small transmission power. Hence, a measurement result similar to an actual use environment of a radio terminal can be acquired, by using the low power base station to measure reception quality of the high power base station 100.

In the first embodiment, the high power base station 100 transmits measurement instruction information on a regular basis. Hence, the communication parameter of the high power base station 100 can be reconfigured in accordance with changes in the radio propagation environment.

In the first embodiment, the high power base station 100 can specify aspects of the measurement by including measurement condition information in the measurement instruction information. This enables a more meaningful measurement.

In the first embodiment, the high power base station 100 determines whether or not its communication parameter needs to be reconfigured. Accordingly, the load can be dispersed as compared to a case where the analysis is concentrated in a server. Moreover, since the high power base station 100 can easily detect its own failure, upon occurrence of a change in reception quality, the high power base station 100 can determine whether the change is attributable to a change in the surrounding environment or to its own failure.

Second Embodiment

In the above first embodiment, a description is given of a case of collecting measurement result information by use of the radio terminal 300c connecting to the high power base station 100, the low power base station 200a near the high power base station 100, and the radio terminal 300a connecting to the low power base station 200a.

In a second embodiment, a description is given of a case of collecting measurement result information by also using a radio terminal connecting to a high power base station near the high power base station 100. Note that in the following second embodiment, points different from the first embodiment are described and redundant descriptions are omitted.

Figure 7:
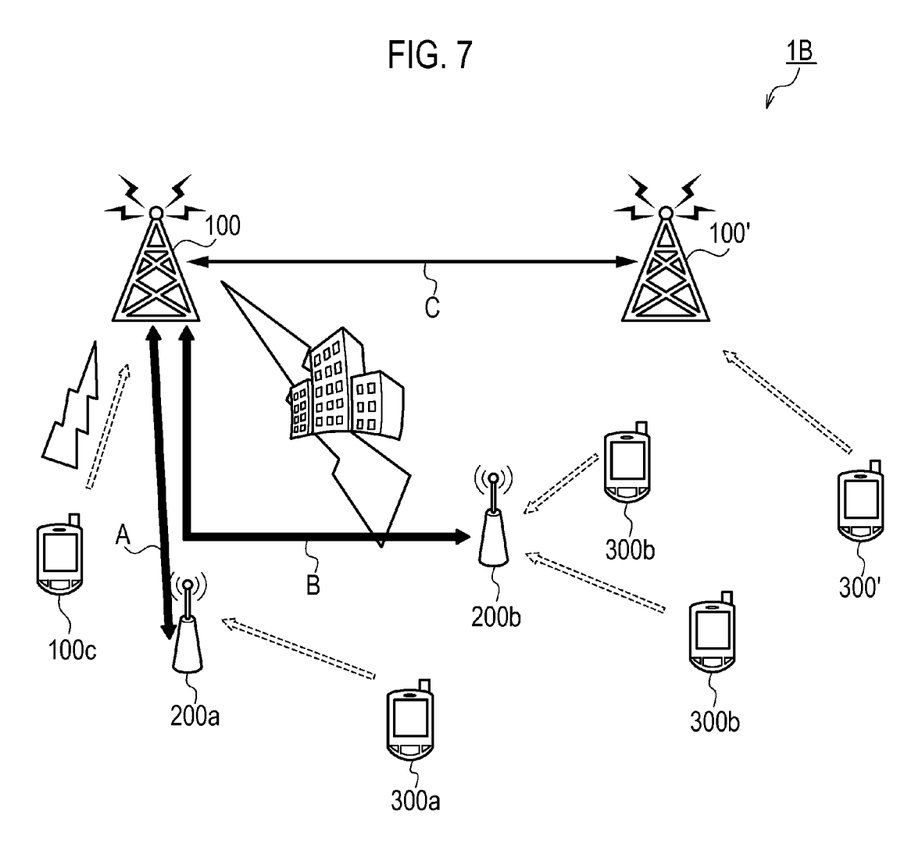
FIG. 7 is a schematic configuration diagram of a radio communication system of a second embodiment of the present invention.

FIG. 7 is a schematic configuration diagram of a radio communication system 1B of the second embodiment. As shown in FIG. 7, the radio communication system 1B is different from the first embodiment in that the system further includes a high power base station 100' located near the high power base station 100, and a radio terminal 300' connecting to the high power base station 100'. The radio terminal 300' has a similar configuration as the radio terminal of the first embodiment. The high power base station 100 and the high power base station 100' can directly communicate with each other via an X2 interface C. The high power base station 100 transmits measurement instruction information to the high power base station 100' via the X2 interface C.

Figure 8:
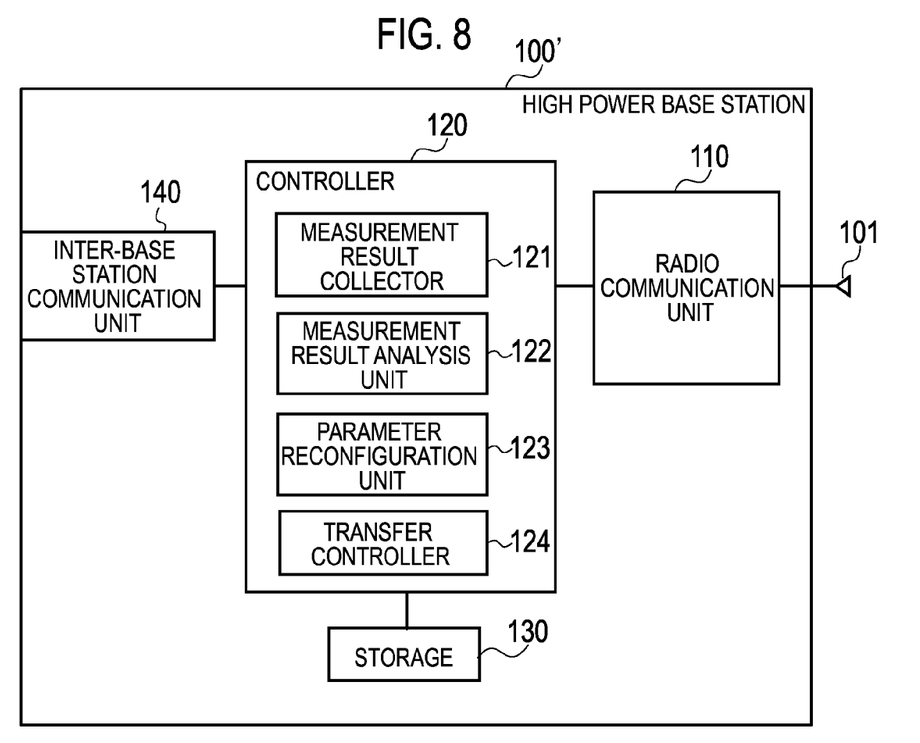
FIG. 8 is a block configuration diagram of a high power base station of the second embodiment of the present invention.

The high power base station 100' has a function of transferring measurement instruction information and measurement result information, in addition to the functions of the high power base station 100 of the first embodiment. FIG. 8 is a block configuration diagram of the high power base station 100' of the second embodiment. As shown in FIG. 8, the high power base station 100' includes a transfer controller 124 configured to perform control so that the controller 120 can transfer information exchanged between the inter-base station communication unit 140 and the radio communication unit 110. Specifically, the transfer controller 124 performs control so that the measurement instruction information received from the high power base station 100 by the inter-base station communication unit 140 can be transferred from the radio communication unit 110 to the radio terminal 300'. Additionally, the transfer controller 124 performs control so that the measurement result information received from the radio terminal 300' by the radio communication unit 110 can be transferred from the inter-base station communication unit 140 to the high power base station 100.

According to the second embodiment, the high power base station 100 can be aware not only of the radio propagation environment within its own communication area, but also of a radio propagation environment within a communication area of the neighboring high power base station 100'. Thus, when a dead zone or a weak field zone is detected within the communication area of the high power base station 100', for example, the high power base station 100 can maintain a favorable communication quality for the entire system by reconfiguring the communication parameter so as to cover the dead zone or the weak field zone.

Third Embodiment

In the above embodiments, descriptions are given of cases of collecting measurement result information by use of the low power base station 200a, the low power base station 200b, and the radio terminals connecting to these base stations. In LTE Advanced, relay transmission using a radio relay station called a relay node is expected to be employed. If a radio relay station is connected to the high power base station 100, the high power base station 100 may also transmit measurement instruction information to the radio relay station.

Figure 9:
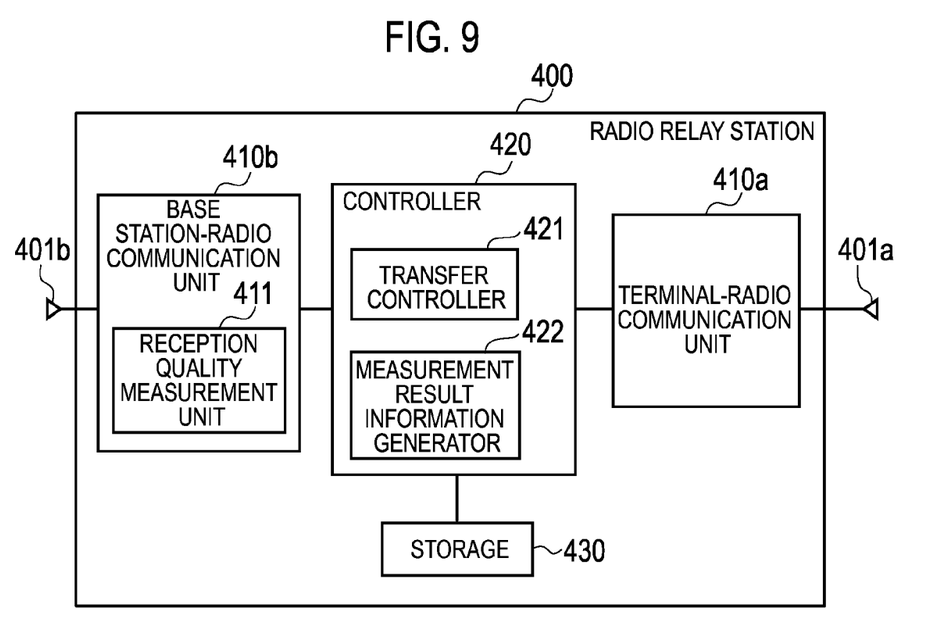
FIG. 9 is a block configuration diagram of a radio relay station of a third embodiment of the present invention.

FIG. 9 is a block configuration diagram of a radio relay station 400 of a third embodiment. The radio relay station 400 includes antenna units 401a, 401b, a terminal-radio communication unit 410a, a base station-radio communication unit 410b, a controller 420, and a storage 430.

The terminal-radio communication unit 410a is formed of an RF circuit, a baseband processor and the like, for example, and exchanges radio signals with a radio terminal via the antenna unit 401a. In addition, the terminal-radio communication unit 410a encodes and modulates transmission signals, as well as demodulates and decodes reception signals.

The base station-radio communication unit 410b is formed of an RF circuit, a baseband processor and the like, for example, and exchanges radio signals with the high power base station 100 via the antenna unit 401b. In addition, the base station-radio communication unit 410b encodes and modulates transmission signals, as well as demodulates and decodes reception signals.

The controller 420 is formed of a CPU, for example, and controls various functions of the radio relay station 400. The storage 430 is formed of a memory, for example, and stores therein various information used for control and the like of the radio relay station 400. The controller 420 includes a transfer controller 421 and a measurement result information generator 422. The base station-radio communication unit 410b includes a reception quality measurement unit 411. The transfer controller 421, the measurement result information generator 422, and the reception quality measurement unit 411 respectively have similar functions as the transfer controller 221, the measurement result information generator 222, and the reception quality measurement unit 211 described in the first embodiment.

According to the third embodiment, reception quality of the high power base station 100 can be measured by use of the radio relay station 400, whereby a larger amount of measurement result information can be acquired, and reception quality can be measured for a larger area.

Other Embodiments

Although contents of the present invention have been described according to the foregoing embodiments of the invention, it should not be understood that descriptions and drawings constituting part of this disclosure limit the present invention. From this disclosure, various alternative embodiments, examples, and operation techniques will be easily found by those skilled in the art.

Although it has been described in the above embodiments that the radio terminal includes a system (such as GPS) for measuring its own location, the radio terminal does not necessarily have to include such a system. In this case, the high power base station 100 can acquire location information on radio terminals from a location management server installed in a network, and thus the location information is not necessarily included in the measurement result information. The location management server is referred to as an E-SMLC (e-Serving Mobile Location Center) in LTE. The location information server collects information such as differences among arrival times of radio signals transmitted from different radio base stations to each radio terminal, and base station IDs included in the radio signals, to thereby generate and manage location information on each radio terminal. For details of such a location information server (E-SMLC), refer to 3GPP TS 36.305: "Evolved Universal Terrestrial Radio Access Network (E-UTRAN); Stage 2 functional specification of User Equipment (UE) positioning in E-UTRAN." Moreover, since the location of a low power base station is fixed, the high power base station 100 may previously store therein locations of neighboring low power base stations.

In the above embodiments, measurement result information reported from the radio terminal to the radio base station is defined as a new message. However, measurement information may be formed of a Measurement Report or CQI (Channel Quality Indication) which are information pieces reported from a radio terminal to a radio base station in an LTE system.

Although it has been described in the above embodiments that each radio terminal measures reception quality of a reference signal, the radio terminal may perform control to measure reception quality of a specific frequency. To be precise, a measurement target frequency can be specified by including information on the measurement target frequency in measurement instruction information. This makes it possible to detect a change in reception quality in each location for each frequency. Hence, when reception quality is deteriorated for a specific frequency, the system can be operated by reconfiguring a scheduling policy so that the specific frequency is assigned as less as possible.

Although it has been described in the above embodiments that the high power base station 100 communicates with each of the low power base station 200a and the low power base station 200b through wired communication, they may communicate through radio communication instead. In other words, both of the X2 interface A and the X2 interface B may be set in radio communication sections.

The radio communication systems of the above embodiments are configured to collect measurement result information upon receipt of measurement instruction information. However, in addition to such a collection method, a configuration may be employed in which measurement result information is collected at predetermined timings. For example, the low power base station 200a and the low power base station 200b may regularly transmit measurement result information to the high power base station 100 without receiving measurement instruction information.

Although radio communication systems according to LTE or LTE-Advanced have been described in the above embodiments, the present invention is also applicable to other radio communication systems such as a radio communication system according to WiMAX standards (IEEE 802.16).

Thus, it should be understood that the present invention includes various embodiments and the like which are not described herein. Accordingly, the technical scope of the present invention should be determined only by the matters to define the invention in the scope of claims regarded as appropriate based on the description.

Note that the entire content of Japanese Patent Application No. 2010-91558 (filed on Apr. 12, 2010) is incorporated herein by reference.

INDUSTRIAL APPLICABILITY

As has been described, the radio communication system, the radio base station, and the method for reconfiguring a communication parameter of the present invention are capable of easily coping with a change in a radio propagation environment, and thus are useful in radio communication such as mobile communication.

The invention claimed is:

1. A radio communication system including a plurality of radio base stations, wherein
a target base station being a target for reconfiguring a communication parameter comprises:
a measurement instruction transmitter configured to transmit measurement instruction information to a neighboring base station located near the target base station, the measurement instruction information giving an instruction to measure reception quality of a radio signal transmitted by the target base station;
a measurement result collector configured to collect, from the neighboring base station, measurement result information indicating a result of measurement of the reception quality; and
a parameter reconfiguration unit configured to reconfigure the communication parameter of the target base station according to the measurement result information collected by the measurement result collector.

2. The radio communication system according to claim 1, wherein the neighboring base station comprises:
a measurement instruction transfer unit configured to transfer the measurement instruction information received from the target base station, to a controlled terminal being a radio terminal connecting to the neighboring base station; and
a measurement result transfer unit configured to collect the measurement result information from the controlled terminal and transfer the collected measurement result information to the target base station.

3. The radio communication system according to claim 1, wherein the neighboring base station comprises:
a reception quality measurement unit configured to measure the reception quality in response to the measurement instruction information received from the target base station; and
a measurement result transmitter configured to transmit, to the target base station, the measurement result information indicating a result of measurement by the reception quality measurement unit.

4. The radio communication system according to claim 1, wherein a low power base station having a smaller transmission power than the target base station is included as the neighboring base station.

5. The radio communication system according to claim 1, wherein the measurement instruction transmitter transmits the measurement instruction information on a regular basis.

6. The radio communication system according to claim 1, wherein the measurement instruction information comprises:

an identifier for identifying the target base station; and
measurement condition information indicating a condition for measuring the reception quality.

7. The radio communication system according to claim 1, wherein the target base station comprises an analysis unit configured to determine whether or not the communication parameter of the target base station needs to be reconfigured, by analyzing the measurement result information collected by the measurement result collector.

8. The radio communication system according to claim 1, wherein in a case where a radio relay station is connected to the target base station, the measurement instruction transmitter transmits the measurement instruction information to the neighboring base station and the radio relay station.

9. A radio base station comprising:
a measurement instruction transmitter configured to transmit measurement instruction information to a neighboring base station located near the radio base station, the measurement instruction information giving an instruction to measure reception quality of a radio signal transmitted by the radio base station;
a measurement result collector configured to collect measurement result information indicating a result of measurement of the reception quality from the neighboring base station; and
a parameter reconfiguration unit configured to reconfigure a communication parameter of the radio base station according to the measurement result information collected by the measurement result collector.

10. A radio base station comprising:
a measurement instruction receiver configured to receive measurement instruction information from a target base station being a target for reconfiguring a communication parameter, the measurement instruction information giving an instruction to measure reception quality of a radio signal transmitted by the target base station;
a measurement instruction transfer unit configured to transfer the measurement instruction information received by the measurement instruction receiver, to a controlled terminal being a radio terminal connecting to the radio base station; and
a measurement result transfer unit configured to collect the measurement result information from the controlled terminal and transfer the collected measurement result information to the target base station.

11. A radio base station comprising:
a measurement instruction receiver configured to receive measurement instruction information from a target base station being a target for reconfiguring a communication parameter, the measurement instruction information giving an instruction to measure reception quality of a radio signal transmitted by the target base station;
a reception quality measurement unit configured to measure the reception quality in response to the measurement instruction information received from the target base station; and
a measurement result transmitter configured to transmit the measurement result information indicating a result of measurement by the reception quality measurement unit to the target base station.

12. A method for reconfiguring a communication parameter used in a radio communication system including a plurality of radio base stations, the method comprising the steps of:
transmitting, by a target base station being a target for reconfiguring the communication parameter, measurement instruction information giving an instruction to measure reception quality of a radio signal transmitted by the target base station, to a neighboring base station located near the target base station;
collecting by the target base station measurement result information indicating a result of measurement of the reception quality; and
reconfiguring by the target base station the communication parameter of the target base station according to the measurement result information collected in the collecting step.

* * * * *